United States Patent [19]

Walker

[11] Patent Number: 4,683,006

[45] Date of Patent: Jul. 28, 1987

[54] BUILDING MATERIALS

[75] Inventor: Bryan J. Walker, Bedford, England

[73] Assignee: 501 Granulite Limited, Oxfordshire, England

[21] Appl. No.: 817,744

[22] PCT Filed: Apr. 11, 1985

[86] PCT No.: PCT/GB85/00158
§ 371 Date: Feb. 12, 1986
§ 102(e) Date: Feb. 12, 1986

[87] PCT Pub. No.: WO85/04649
PCT Pub. Date: Oct. 24, 1985

[30] Foreign Application Priority Data

Apr. 12, 1984 [GB] United Kingdom ............... 8409468

[51] Int. Cl.$^4$ ............................................. C04B 14/00
[52] U.S. Cl. ................... 106/288 R; 106/118; 106/120; 106/309
[58] Field of Search .............. 106/288, 118, 120, 309

[56] References Cited

U.S. PATENT DOCUMENTS 3,192,060 6/1965 Tilsen .................................. 106/97
4,018,619 4/1977 Webster ............................. 106/118
4,105,463 8/1978 Angelbeck ........................ 106/120

FOREIGN PATENT DOCUMENTS 1173054 12/1969 United Kingdom .

OTHER PUBLICATIONS

Chem. Abst. 57: 14715c; Korach et al, 1962.
Proceedings of Canmet/ACI First Int. Conf. on the Fly Ash, Silica Fume, Slag and Other Mineral Byproducts in Concrete, vol. 1, Malhotra, V. M., pp. 495–517, Jul. 31, 83, WO, 8401367 (B. J. Walker), 12 Apr. 84.

Primary Examiner—Theodore Morris
Attorney, Agent, or Firm—Birch, Stewart, Kolasch and Birch

[57] ABSTRACT

A building material formed of a natural or artificial pozzolan and not more than 5% by weight of added lime. The building material is in the form of granules or pellets and is useful as an aggregate for producing lightweight building blocks.

10 Claims, 1 Drawing Figure

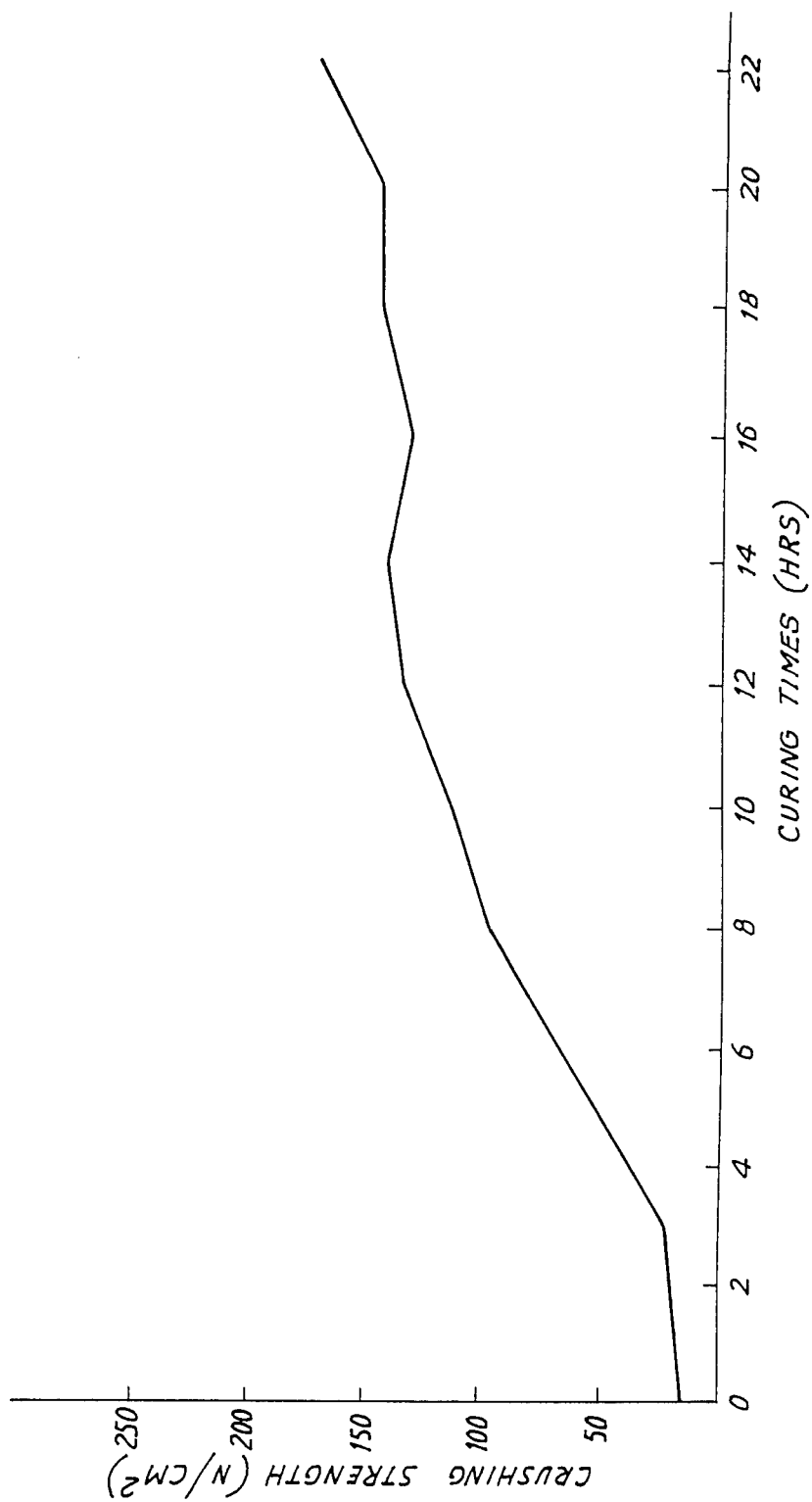

BUILDING MATERIALS

This invention relates to building materials and more especially to building materials in granular, for example, pelletised, form, especially for use as an aggregate for producing lightweight building blocks.

The invention provides a building material in the form of granules or pellets (hereinafter referred to as pellets), the material being formed from a natural or artificial pozzolan and not more than 5% by weight of added lime (calculated as CaO), the granules being internally bonded by a pozzolanic bond including mechanical bonds formed by crystallites of etteringite and amorphous calcium silicate, calcium aluminate or calcium alumosilicate or a mixture of any two or more such calcium salts.

In the building material of the invention the pozzolan is preferably pulverised fly ash although other natural or artificial pozzolans can be used.

The material of the invention can be formed by mixing the pozzolan with not more than 5% of added lime (calculated as CaO), preferably as calcium hydroxide, forming the mixture into pellets and curing the granules in a moisture controlled atmosphere at a temperature of from 35° C. to 80° C. preferably from 50° C. to 80° C.

Using a mixture of pulverised fly ash and 3% calcium hydroxide (2.25% calculated as CaO) a bond is formed in as short a period as two hours at 50° C. giving pellets with a crushing strength of up to 10 Newtons per square centimeter. The brushing strength of the pellets continues to increase over a period of at least six months, after which time crushing strengths of up to 500 Newtons per square centimeter have been recorded.

Pellets having crushing strengths of about 50 Newtons per square centimeter can be obtained by curing for about six to ten hours at 50° C.

It is extremely surprising that such strengths can be achieved in such a short time, especially having regard to the extremely low lime content of the mix. It has generally been considered that to produce pozzolanic bonds in mixtures of pulverised fly ash and lime, amounts of lime in excess of 5% are required and moreover long curing periods, usually of at least several days are required before a strong bond is formed.

The pellets which generally have a size within the range of from 5 to 15 mm may be produced by any desired pelletising process, for example, they may be produced in a pelletiser e.g. a drum or non pelletiser, or by prilling or extrusion or by compacting a mass of the mixture beneath grooved rollers and cutting the resulting strips of compacted material into desired lengths.

The single FIGURE of the accompanying drawings is a graph showing crushing strengths against curing time for a 9 centimeter drum granulated pellet produced from a mixture of 97% pulverised fly ash and 3% lime cured at a temperature of 50° C.

The nature of the bond in the pellets has been determined by X-ray defraction and my chemical analysis using the florentine method.

I claim:

1. A building material in pellet form, the material being formed from pulverized fly ash and not more than 5% by weight of added lime (calculated as CaO), the pellets being internally bonded by a pozzolanic bond comprising mechanical bonds formed by crystallites of etteringite and amorphous calcium silicate, calcium aluminate or calcium alumosilicate or mixtures thereof.

2. The building material of claim 1, wherein the pellet has a size within the range of from 5 to 15 mm.

3. The building material of claim 1, wherein the lime is calcium hydroxide.

4. The building material of claim 3, wherein the amount of calcium hydroxide present is 3% by weight.

5. The building material of claim 1, further having a pellet crushing strength of up to 10 Newtons per square centimeter.

6. The building material of claim 1, further having a pellet crushing strength of up to 50 Newtons per square centimeter.

7. The building material of claim 1, further having a pellet crushing strength of up to 500 Newtons per square centimeter.

8. A method for producing the building material of claim 1 comprising mixing fly ash with not more than 5% by weight of added lime (calculated as CaO), forming the mixture into pellets and curing the pellets in a moisture controlled atmosphere at a temperature of from 35° C. to 80° C.

9. The method of claim 8, therein the temperature is from 50° C. to 80° C.

10. The method of claim 8, wherein the lime is calcium hydroxide.

* * * * *